United States Patent [19]

Muller

[11] Patent Number: 4,809,292

[45] Date of Patent: Feb. 28, 1989

[54] METHOD AND DEVICE TO TRANSFORM ELECTROMAGNETIC WAVES

[76] Inventor: Eberhard Muller, Liliencronstrasse 9a, 2000 Hamburg 73, Fed. Rep. of Germany

[21] Appl. No.: 51,466

[22] PCT Filed: Aug. 27, 1986

[86] PCT No.: PCT/EP86/00502

§ 371 Date: Apr. 17, 1987

§ 102(e) Date: Apr. 17, 1987

[87] PCT Pub. No.: WO87/01503

PCT Pub. Date: Mar. 12, 1987

[30] Foreign Application Priority Data

Aug. 30, 1985 [IE] Ireland ................................ 2154/85

[51] Int. Cl.$^4$ ................................ H01S 3/08

[52] U.S. Cl. ................................ 372/92; 372/69; 372/109

[58] Field of Search ................................ 372/92, 69, 109

*Primary Examiner*—Leon Scott, Jr.

*Attorney, Agent, or Firm*—William R. Hinds

[57] ABSTRACT

Generation of monochromatic coherent electromagnetic radiation by application of Bose-Einstein condensation of electromagnetic radiation which is achieved by causing a sufficiently large, overcritical mean energy density of electromagnetic radiation in a suitable cavity for electromagnetic radiation.

7 Claims, 4 Drawing Sheets

METHOD AND DEVICE TO TRANSFORM ELECTROMAGNETIC WAVES

Figure 1:
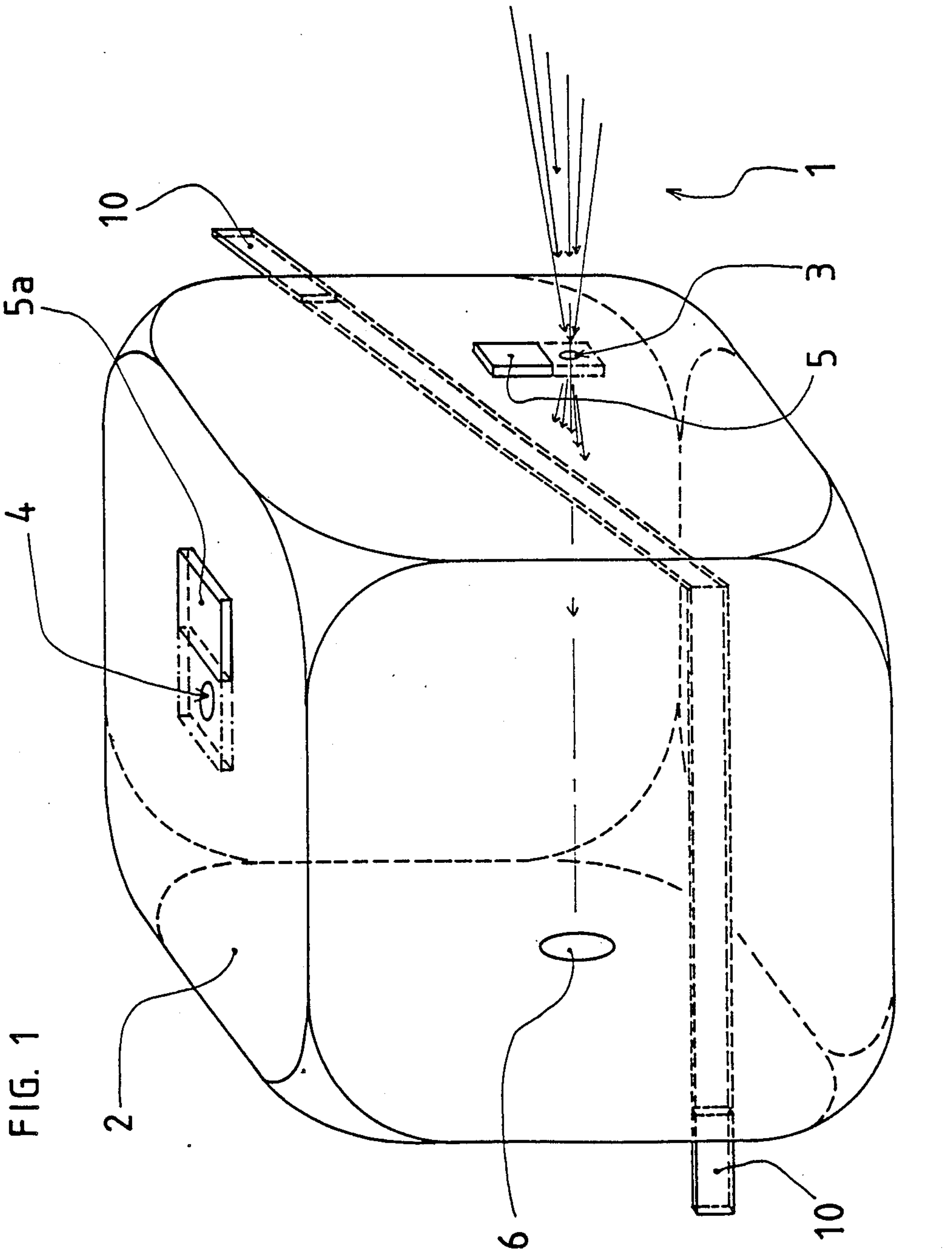

The invention refers to a method and a device to transform electromagnetic waves, in particular light, into monochromatic coherent electromagnetic radiation of a predeterminable frequency and heat radiation, where the predeterminable frequency is the lowest frequency of the Planck-distributed frequency spectrum of the heat radiation. It is an object of the invention to concentrate electromagnetic radiation in a cavity with reflecting walls to such a degree that the mean density of the radiation in the cavity exeeds a critical value, and that the portion of the radiation exceeding this value occupies the lowest electromagnetic energy mode of the cavity.

For cavities with reflecting walls one faces the following two problems:

1. To what extent is it possible to concentrate the energy of electro-magnetic radiation?
2. To what extent can concentrated electromagnetic radiation be stored?

Focussing light, for example, and "filling" it through an opening (or a window) into a cavity with reflecting walls the prior-art expectation is a stationary equilibrium established at the opening between in-going directed, and out-going light, such that the intensity of light cannot exceed an amount given by the degree of focussing. When the supply of light is interrupted and the cavity is closed, due to the reflectivity losses, a "black radiation" ("Hohlraumstrahlung", "black body radiation") determined by the temperature of the walls, will be established in a very short time so that a storing of energy is not possible.

In the case of superconducting microwave cavities (D. G. Blair, S. K. Jones: High Q sapphire loaded superconducting cavities and applications to ultrastable clocks, IEEE Trans. Magn. Mag 21 (1985) 142–145; contains further references) the enclosure of electromagnetic energy is extended to a duration in the order of magnitude of seconds; owing to the small energy of the involved radiation, the still very short storage time, and the disproportionate cooling requirements, again, a practical application to convert and to store energy cannot be considered.

By means of the invention described below it is possible to concentrate electromagnetic radiation energy to such an extent, and simultaneously to reduce the relative losses during the enclosing so greatly that, among other things, it can be used to store energy. The invention thereby applies Bose-Einstein condensation of electromagnetic radiation.

For the quantum-statistical description of an ideal gas of indistinguishable particles of non-zero rest mass, subject to Bose statistics, Einstein found (A. Einstein: Quantentheorie des einatomigen idealen Gases, zweite Abhandlung, Sitzungsberichte der preussischen Akademie der Wissenschaften, physikalisch-mathematische Klasse, 1925, I), that there is a critical particle density so that, when it is exceeded, the excess particles go over spontaneously into the state of lowest energy, where their kinetic energy is zero and their contribution to the pressure of the boson gas vanishes; hence, for the critical particle density, there exists a critical pressure which cannot be exceeded. This "Bose-Einstein condensation" is used to explain the superfluidity of Helium.

Photons, the basis for the quantum-field-theoretical discussion of electromagnetic radiation, are subject to Bose statistics. However their rest mass is zero. Therefore the question of a Bose-Einstein condensation in a gas of free photons presents a problem, since particles, whose rest mass and kinetic energy are simultaneously zero, cannot exist. Hence, in physical literature, up to now, a Bose-Einstein condensation of free photons has not been considered to be physically relevant; the discussion of the photon gas excludes a photon condensation either from the very ansatz, by proceeding on the assumption of a canonical ensemble of indefinite particle number (e.g. R. Jost: Quantenmechanik II, Verlag der Fachvereine an der ETH-Zürich, 1973) or the mathematical deduction is incorrect (e.g. L. D. Landau, E. M. Lifschitz: Lehrbuch der theoretischen Physik, Bank V, Akademie-Verlag, Berlin, 1975; an error which excludes Bose-Einstein condensation in an ideal Bose gas for Dirichlet boundary conditions which are relevant for reflecting walls occurs in: D. W. Robinson: Bose-Einstein condensation with attractive boundary conditions, Communications in Mathematical Physics 50 (1976) 53), or a photon condensation is mentioned only speculatively and in general terms, without physical and mathematical foundation (e.g. P. T. Landsberg: Thermodynamics, 1. edition, Interscience Publishers, New York, 1961).

A mathematically correct treatment of the Bose-Einstein condensation in an ideal gas of bosons of non-zero rest mass has only existed since the beginning of the seventies (J. T. Lewis: The free Boson gas, Proceedings of the LMS Instructional Conference, Bedford College, 1971, "Mathematics of Contemporary Physics", ed. R. F. Streater, Academic Press, London, New York, 1972; J. V. Pulè: D.Phil. Thesis, Oxford, 1972). In the paper M. van den Berg, J. T. Lewis, and J. V. Pulè: A general theory of Bose-Einstein condensation, DIAS-STP-82-35, Dublin Institute for Advanced Studies, 1982, the general case of an ideal boson gas is mathematically rigorously treated, without restriction to the case of particles of non-zero rest mass, but without any reference to a possible relevance for free photons.

It is an object of the invention to apply an extension of the mathematical theory of Lewis et al. to the case of a free photon gas in the grand-canonical thermal equilibrium, implying Bose-Einstein condensation in the case of the mean energy density of the photons exceeding a critical value. This is provided by the invention. The physical relevance for the application of this solution is the following:

For a finite cavity with reflecting, smooth walls the eigenstate of lowest energy is determined by the dimensions of the cavity and corresponds to a non-zero photon energy. If the cavity contains electromagnetic radiation of a mean energy density which exceeds the critical one, the Bose-Einstein condensation manifests itself such that the portion of radiation exceeding the critical density spontaneously occupies, substantially, the state of lowest energy, thereby binding the excess energy which exceeds the critical energy density. Thus, in addition to the radiation with black radiation spectrum, a practically monochromatic, coherent electromagnetic wave is formed the frequency of which corresponds to the lowest energy eigenvalue of the cavity containing the electromagnetic radiation. For cavities of dimensions in the range of meters these are VHF-frequencies, for dimensions in the range of centimeters or millimeters these are microwave frequencies. The macroscopically occupied electromagnetic ground state carrying the excees energy, the "condensate" of the Bose-Einstein condensation so to speak, does not contribute appreciably to the radiation pressure, and it is mainly localized around the center of the cavity.

Thus the reflectivity losses in this ground state are drastically reduced. The more energy is bound in the ground state, the smaller is the relative radiation loss with respect to the total electromagnetic radiation present in the cavity.

A critical value of the radiation pressure exists in the sense that for any arbitrary mean energy density of electromagnetic radiation that exceeds the critical one, the dimensions of the cavity which contains the electromagnetic radiation can be chosen such that the deviation of the actual radiation pressure in the cavity from the critical value can be brought down below any bound, no matter how small.

By a suitable choice of the size of the reflecting cavity, practically every amount of electromagnetic radiation energy can be radiated into the cavity as soon as the radiation density in radiating-in exceeds the critical value, because practically no additional counterpressure is then built up in the cavity any longer.

The invention therefore applies technically the Bose-Einstein condensation in the case of electromagnetic radition, and provides a device to generate electromagnetic radiation of a mean energy density which is greater than a critical mean energy density $u_{crit}$, an enclosure of dimension d, and a device or arrangement to direct radiation of overcritical means energy density into the enclosure where the enclosure is adapted in such a way as to scatter diffusely the electromagnetic radiation falling in, and the quality of the reflectivity of the surface or boundary enclosing the enclosure being such that the power of the electromagnetic radiation directed into the enclosure is greater than the total power lost in absorption by the boundary of the enclosure at a value of the electromagnetic energy density in the enclosure which is greater than $$u_{crit} = u_{crit}(T,d) = \pi^{1-d}\,(2 + (-1)^{d-1})\,(\hbar c)^{-d}\,(kT)^{d+1} \sum_{n=1}^{\infty} n^{-(d+1)},$$

so that, after obtaining an electromagnetic energy density in the enclosure with a mean value u, which is greater than $u_{crit}$, the excess energy $u-u_{crit}$ spontaneously occupies mainly the lowest energy state of the enclosure; thereby k means the Boltzmann constant, $2\pi n$ the Planck constant, c the velocity of light, T (in Kelvin) that temperature which is computed for a thermodynamic equilibrium given by the mean photon number density in the enclosure and the mean electromagnetic energy density in the enclosure, and p1 d has the value 2 in the case of an enclosure of effective dimension 2, and the value 3 in the case of an enclosure of dimension 3, and where the electromagnetic energy densities give the energy per polarization mode, and refer to the unit volume in the case of d=3, and to the unit area in the case of d=2.

It is an object of the invention that the cavity having dimension d is further adapted to retain therein and to permit the controlled output therefrom of a substantial amount of electromagnetic radiation where d is either 2 or 3.

An application for dimension d=2 would be, e.g., the radiating into a layer where the thickness of the layer is negligible compared to the extension of its area.

The invention will be understood in greater detail from the following description of preferred embodiment given by way of example only and with reference to the accompanying schematic drawings. The description specifies explicitly, in a schematic way, an absorber providing some interaction between radiation and cavity which is necessary for the spontaneous condensation effect.

Figure 2:
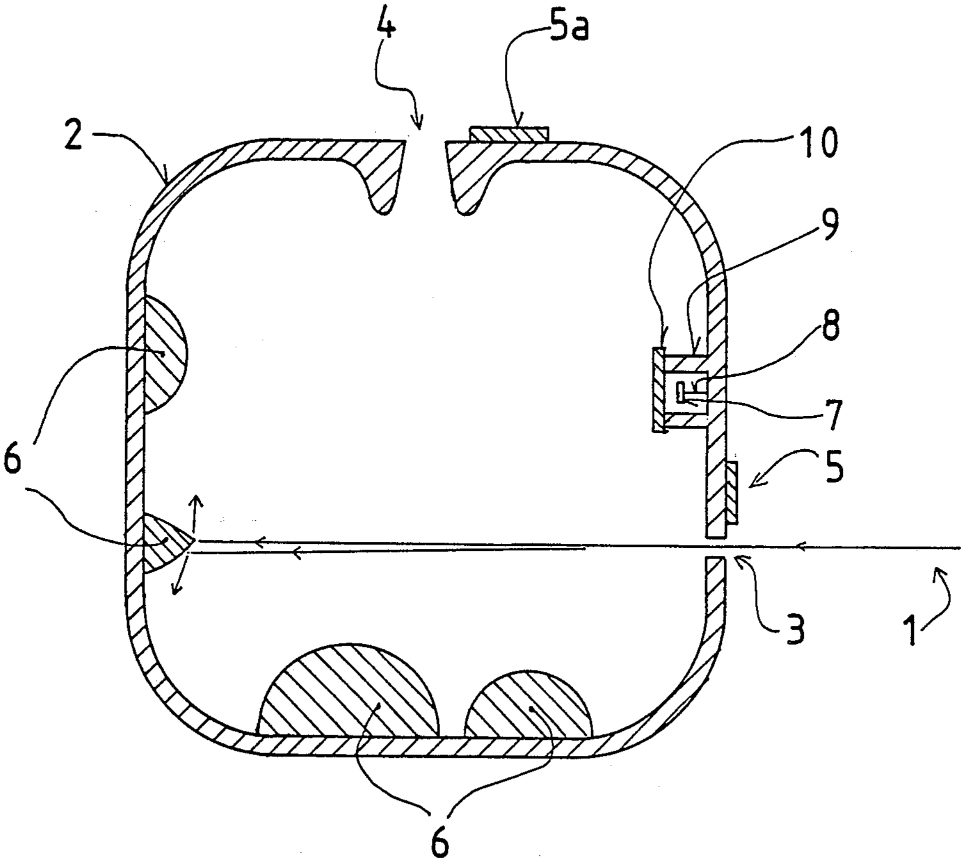
Figure 3:
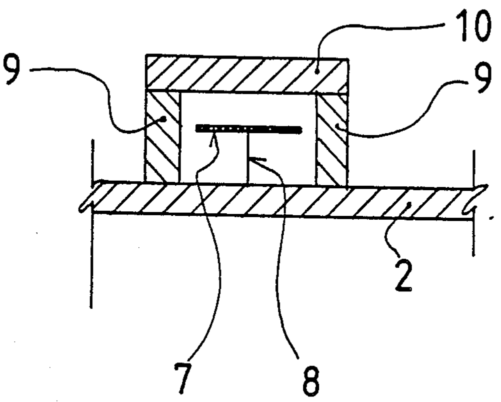
Figure 4:
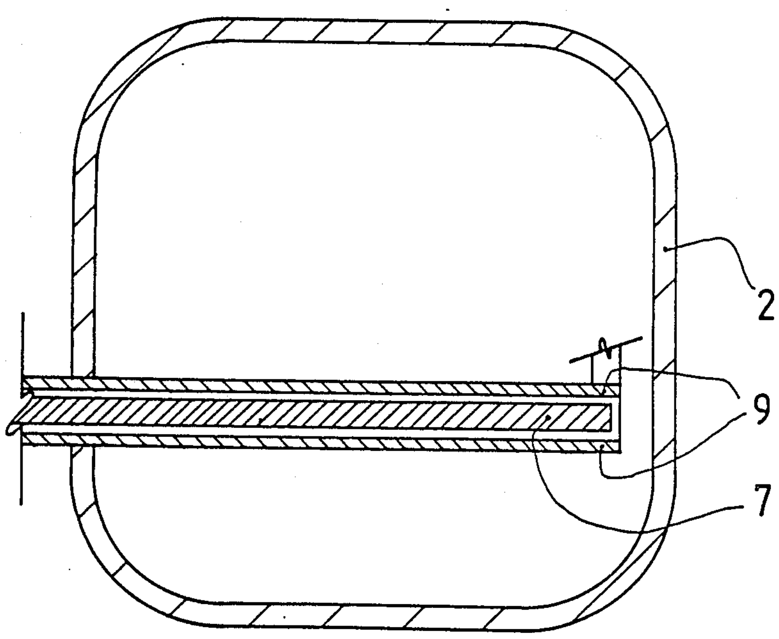
Figure 5:
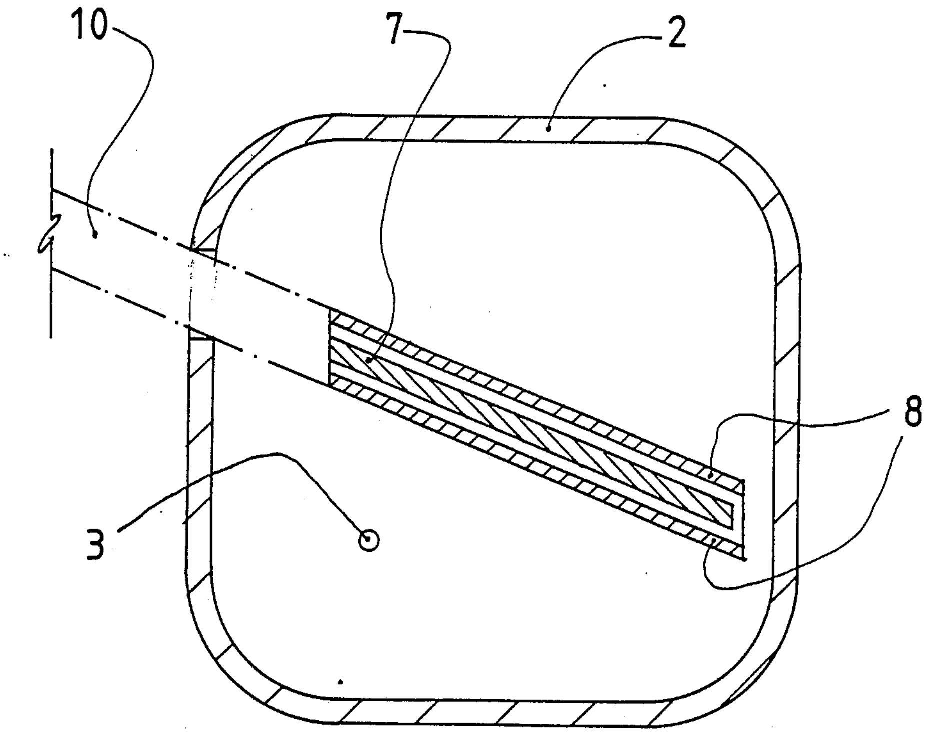

FIG. 1 shows schematically, in perspective representation, a cavity according to the invention, without absorber, without fixing for the absorber, and without base, all of which have been omitted for the sake of simplification, as well as the diffusers, where only one of them is marked, FIG. 2 shows a cross sectional of the cavity, FIG. 3 shows a cross section of the covering of the absorber slicing through base and slide, with its fixing on the interior wall of the cavity, FIG. 4 shows the situating of the absorber with base, without slide, viewed on the interior side of the front wall, and, FIG. 5 shows the further situation of the absorber connected with the part shown in FIG. 4, combined with the base, partially covered by the slide.

From lasers (and masers), not shown in the drawings, each with broad band output spectrum and selected so that their combined frequency ranges approximately generate a Planck spectrum the temperature of which being compatible with the material of a black absorber 7 in the cavity 2, electromagnetic radiation 1 is directed—while the slides 10 are closed which in this position shield the absorber 7 from the enclosure—into the cavity 2 through the input opening 3, and diffusely, elastically scattered by means of (schematically drawn) diffusers 6. To achieve a high reflectivity in the enclosure the inside walls of the cavity 2, as well as the surface of the base 9 which carries the slides 10, the surface of the slides 10, and of the diffusers 6 are superconducting, after being cooled down to a sufficiently low temperature. The power of the lasers is adapted to the reflectivity of the cavity, so that after radiating-in for a sufficiently long time, the mean energy density of the electromagnetic radiation in the enclosure becomes so large that it remains above the critical value $u_{crit}=u_{crit}$ (T,3) even after opening the slides 10 (and the consecutive heating up of the absorber up to the temperature T); therefore the abosrber is supposed to have a minimum heat capacity. The slides 10 are led in the wall so that apart from the absorber 7 the reflectivity in the enclosure is not appreciably disturbed; the covers of the input opening 3 and the output opening 4 reflect towards the enclosure (superconducting surface). The absorber 7 has no direct contact with the bases 9, the slides 10, and the walls of the cavity 2, and it is carried by thermally very well insulating fixings 8 which are fitted in the wall of the cavity 2.

The presence of the absorber supports the establishing of thermal equilibrium of the radiation in the cavity and hence the building up of the monochromatic, coherent electromagnetic wave, which occupies the energetic ground state of the cavity, and which absorbs the excess energy exceeding the critical energy.

In use, by means of the lasers, the desired amount of radiation is directed through the input openings 3 into the cavity which has been made superconducting. By opening the slides, the absorber 7 is made accessible. After the occurrence of the Bose-Einstein condensation of the radiation one can continue radiating in. The superconducting state of the cavity 2 has no longer to be necessarily maintained; however, under normal conditions too, the boundary should have a good reflectivity quality. For storing, the input opening 3 is closed by a cover 5. For the controlled release of electromagnetic radiation with Planck spectrum, an output opening 4 is used, which otherwise is kept closed. The output power can be determined by the size of the opening which is regulated by means of a cover 5a.

Other ways, to realize the application of the Bose-Einstein condensation of electromagnetic radiation achieved by concentrating radiation above a critical density, can undergo considerable variation; e.g. the function of the absorber might be taken over by a suitable gaseous medium present in the cavity, or in the case of non-superconducting cavities by the effect of the walls. The invention is not limited by the specific embodiment disclosed.

I claim:

1. Method to transform electromagnetic radiation, in particular light, into monochromatic, coherent electromagnetic radiation of a predeterminable frequency and heat radiation where the predeterminable frequency is the lowest frequency of the Planck-distributed frequency spectrum of the heat radiation, characterized by electromagnetic radiation being focussed into a d-dimensional enclosure with reflecting walls or reflecting boundary and diffusely scattered in the enclosure, wherein the power of the focussed radiation and the reflectivity of the enclosure walls or boundary are such that in the enclosure an electromagnetic energy density is built up which is greater than $u_{crit}$, and which remains greater than $u_{crit}$, so that the radiation in the enclosure exceeding $u_{crit}$ is substantially spontaneously transformed into radiation of the frequency of the electromagnetic ground state of the enclosure, which frequency is determined by the geometric dimensions of the enclosure, where $u_{crit}$ is defined by $$u_{crit} = u_{crit}(T,d) = \pi^{1-d}\,(2 + (-1)^{d-1})\,(\hbar c)^{-d}\,(kT)^{d+1} \sum_{n=1}^{\infty} n^{-(d+1)},$$

where k means the Boltzmann constant, $2\pi\hbar$ the Planck constant, c the velocity of light, T (in Kelvin) that temperature which is computed for a thermodynamic equilibrium given by the mean photon number density in the enclosure and the mean electromagnetic energy density in the enclosure, and d has the value 2 in the case of an enclosure of effective dimension 2, and the value 3 in the case of an enclosure of dimension 3, and where all electromagnetic energy densities give the energy per polarization mode, and refer to the unit volume in the case d=3, and to the unit area in the case d=2.

2. Method according to claim 1, characterized by the enclosure being closed after the exceeding of the critical mean energy density, in order to store the energy contained in the transformed electromagnetic radiation.

3. Method according to claim 1, characterized by a gaseous medium present in the cavity being used as scatterer and absorber, in addition to the enclosure.

4. Method according to claim 1, characterized by the mutual relative position of the enclosure walls being manipulated, in order to manipulate the frequency of the ground state of the enclosure after the critical mean energy density is exceeded.

5. Apparatus to transform electromagnetic radiation, in particular light, into monochromatic, coherent electromagnetic radiation of a predeterminable frequency and heat radiation, where the predeterminable frequency is the lowest frequency of the Planck-distributed frequency spectrum of the heat radiation, characterized by means for focusing electromagnetic radiation into a 3-dimensional reflecting cavity through a small opening or window of the cavity, the electromagnetic radiation being scattered in the interior by the geometrical shape of the cavity, and the reflectivity of the walls of the cavity being such that the power of the electromagnetic radiation directed into the cavity is greater than the total power lost in absorption by the walls of the cavity at a value of the electromagnetic energy density in the cavity which is greater than $$u_{crit}(T,3) = 3\pi^{-2}\,(\hbar c)^{-3}\,(kT)^4 \sum_{n=1}^{\infty} n^{-4}$$

so that after obtaining a mean electromagnetic energy density in the cavity with a value u, which is greater than $u_{crit}(T,3)$, the excess energy $u-u_{crit}(T,3)$ spontaneously occupies mainly the lowest energy state of the cavity, thereby building up a practically monochromatic, coherent electromagnetic radiation, the frequency of which is determined by the dimensions of the cavity, and the contribution of which to the pressure of the total electromagnetic radiation in the cavity is drastically reduced, so that the reflectivity losses in this macroscopically occupied ground state of the cavity are drastically reduced, where k means the Boltzmann constant, $2\pi\hbar$ the Planck constant, c the velocity of light, T (in Kelvin) that temperature which is computed for a thermodynamic equilibrium given by the mean photon number density in the cavity and the mean electromagnetic energy density in the cavity, and where all electromagnetic energy densities give the energy per polarization mode and unit volume.

6. Device according to claim 5 characterized by the cavity walls being provided to be movable relative to each other, in order to manipulate the frequency of the ground state of the cavity after the critical mean energy density is exceeded.

7. Apparatus to transform electromagnetic radiation, in particular light, into monochromatic, coherent electromagnetic radiation of a predeterminable frequency and heat radiation, where the predeterminable frequency is the lowest frequency of the Planck-distributed frequency spectrum of the heat radiation, characterized by means for focusing electromagnetic radiation into a 2-dimensional reflecting enclosure through a small opening or window of the enclosure, the electromagnetic radiation being scattered in the interior by the geometrical shape of the enclosure, and the reflectivity of the walls of the enclosure being such that the power of the electromagnetic radiation directed into the enclosure is greater than the total power lost in absorption by the walls of the enclosure at a value of the electromagnetic energy density in the enclosure which is greater than $$u_{crit}(T,2) = \pi^{-1} (\hbar c)^{-2} (kT)^3 \sum_{n=1}^{\infty} n^{-3}$$

so that after obtaining a mean electromagnetic energy density in the enclosure with a value u, which is greater than $u_{crit}(T,2)$, the excess energy $u - u_{crit}(T,2)$ spontaneously occupies mainly the lowest energy state of the enclosure, thereby building up a practically monochromatic, coherent electromagnetic radiation, the frequency of which is determined by the dimensions of the enclosure, and the contribution of which to pressure of the total electromagnetic radiation in the enclosure is drastically reduced, so that the reflectivity losses in this macroscopically occupied ground state of the enclosure are drastically reduced, where k means the Boltzmann constant, $2\pi n$ the Planck constant, c the velocity of light, T (in Kelvin) that temperature which is computed for a thermodynamic equilibrium given by the mean photon number density in the enclosure and the means electromagnetic energy density in the enclosure, and where all electromagnetic energy densities give the energy per polarization mode and unit area.

* * * * *